No. 700,581. Patented May 20, 1902.
A. J. TOWNER.
SNAP HOOK.
(Application filed Mar. 7, 1902.)
(No Model.)
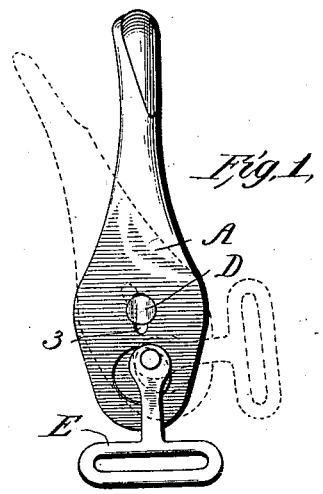
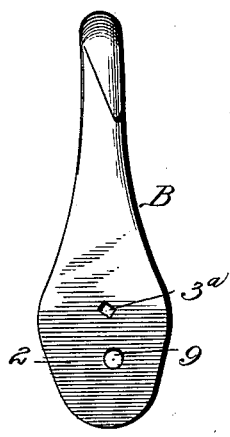
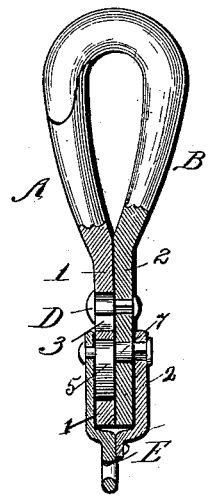
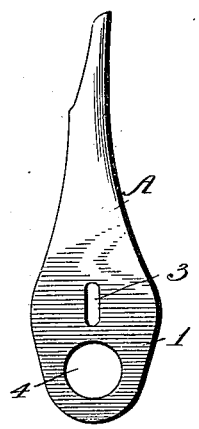
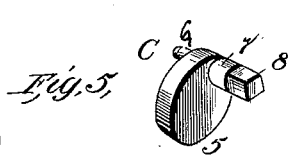
WITNESSES:
Geo. P. Kingsbury
Amos W. Hart
INVENTOR
Arthur J. Towner,
BY Munn & Co
ATTORNEYS

United States Patent Office.

ARTHUR J. TOWNER, OF SANTA ANA, CALIFORNIA.

SNAP-HOOK.

SPECIFICATION forming part of Letters Patent No. 700,581, dated May 20, 1902.

Application filed March 7, 1902. Serial No. 97,084. (No model.)

*To all whom it may concern:*

Be it known that I, ARTHUR J. TOWNER, a citizen of the United States, residing at Santa Ana, in the county of Orange and State of California, have made certain new and useful Improvements in Snap-Hooks, of which the following is a specification.

My invention is an improvement in the class of so-called "twin snap-hooks."

The invention relates particularly to an improved means for opening and closing the two hooks and holding them closed together when in use. The device employed for this purpose is an eccentric, which is peculiarly arranged and rigidly connected with a loop to which a strap is attached in practical use.

The details of construction, arrangement, and operation of parts are as hereinafter described, reference being had to accompanying drawings, in which—

Figure 1 is a face view of my improved snap-hook. Fig. 2 is a face view of one of the hooks, and Fig. 3 is a similar view of the other. Fig. 4 is a side edge view of the complete snap-hook, the lower portion being in section in order to show the arrangement of the eccentric and the pivot. Fig. 5 is a perspective view of the eccentric attachment.

A and B indicate the two hooks, having flat shanks 1 and 2, respectively, which are placed in contact, as shown in Fig. 4. The hook A (see Fig. 3) is provided with a lengthwise slot 3 and the hook B with a polygonal opening 3ª to receive the pivot D. As shown in Fig. 4, such pivot is rigidly secured to the shank 2 of hook B, but is free to slide in the slot 3 of hook A. The pivot is headed at each end, so as to hold the hooks in easy working contact. The lower portion of the shank 1 of hook A is provided with a circular opening 4, which receives the eccentric 5 (see Fig. 5) of the device C. The latter has on one side a trunnion 6, which passes through one of the jaws of the strap-loop E and is headed or flanged, as shown. On the opposite side of the eccentric 5 is a trunnion having a cylindrical portion 7 and a polygonal portion 8. (See Fig. 5.) The cylindrical portion 7 passes through and is adapted to rotate in a circular opening 9, provided in the shank 2 of hook B, (see Fig. 2,) and the polygonal portion 8 is secured in a jaw of the strap-loop E and flanged or headed, so that all the parts A B E are held securely together, but are at the same time free to rotate upon each other, as will now be described. It will be seen from Figs. 4 and 5 that the trunnions 6, 7, and 8 of the eccentric 5 are alined or, in other words, at right angles to the plane of the eccentric. If now the strap-loop E, which, as before stated, is rigidly connected with the polygonal portion 8 of the eccentric trunnion and rotatably connected with the opposite trunnion 6, be turned from the position shown in full lines, Fig. 1, to the position shown in dotted lines, same figure, the eccentric 5 will be moved correspondingly, and by lateral leverage on the shank 1 of hook A cause the upper end or hook proper of the latter to swing in the opposite direction, thus opening the jaws of the twin hook. Contrariwise, when the strap-loop E is moved downward to the normal position—that is to say, into alinement with the hooks—the hook A will be thrown back, with its hook portion into contact with the similar portion of hook B. In other words, when tension is applied to the strap-loop E it tends to hold the two hooks close together or engaged, so that they are, in effect, one hook; but when the strap-loop is swung out of the position the two hooks will be supported so as to allow them to be easily attached to or disengaged from a ring or other connected part. It is apparent that in this operation the hook A has a sliding movement in addition to its rotary one—that is to say, it has a combined rotary and reciprocating movement which is permitted by the slot 3 and the pivot D.

It will be seen that while one eccentric disk 5 suffices to effect the desired movement of the hooks upon each other two such disks might be employed, one for the hook A and the other for the hook B, and that in such case the second eccentric disk would take the place of the cylindrical portion 7 of the trunnion. (See Fig. 5.)

As thus constructed the jaws or hooks proper of my improved snap-hook are held securely locked together when the latter is in use, but may be easily and quickly separated for attachment and detachment.

Having thus described my invention, what I claim as new, and desire to secure by Letters Patent, is—

1. An improved snap-hook of the class described, comprising two hooks or jaws having flat shanks which are placed in contact, an eccentric arranged in a corresponding opening in one of the shanks and having trunnions as specified, and a strap-loop which is rotatably connected with one of said trunnions and rigidly connected with the other, substantially as shown and described.

2. The improved snap-hook of the class described, composed of two hooks having flat shanks, one of which is provided with a lengthwise slot and a circular opening, a pivot passing through said slot and the opposite hook, and an eccentric disk arranged in the said circular opening and having trunnions one of which extends through and is rotatable in the opposite shank, and a strap-loop which is rotatably connected with one of said trunnions and rigidly connected with the other, whereby, when said loop is thrown upward from the normal position, the said hooks are separated in the manner shown and described.

3. An improved snap-hook of the class described, composed of two jaws or hooks proper, which are pivotally connected, and an eccentric which is applied to the shanks below the said pivot, and a strap-loop rigidly connected with one of the trunnions of said eccentric, substantially as shown and described.

4. The eccentric attachment for a twin snap-hook consisting of a disk having trunnions arranged eccentrically, and alined as shown and described, whereby the device is adapted for operation in connection with hooks and a strap-loop in the manner specified.

ARTHUR J. TOWNER.

Witnesses:
JAMES W. TOWNER,
WILLIAM F. GULLEY.